US009867016B2

(12) United States Patent
Sears

(10) Patent No.: US 9,867,016 B2
(45) Date of Patent: Jan. 9, 2018

(54) SYSTEM AND METHOD FOR LOCATING A MOBILE PHONE WITH MOVEABLE WIRELESS BEACONS

(71) Applicant: West Corporation, Omaha, NE (US)

(72) Inventor: Bryan D. Sears, Longmont, CO (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 14/543,401

(22) Filed: Nov. 17, 2014

(65) Prior Publication Data

US 2016/0142884 A1    May 19, 2016

(51) Int. Cl.
| | |
|---|---|
| H04M 11/04 | (2006.01) |
| H04W 4/22 | (2009.01) |
| H04W 4/02 | (2009.01) |
| H04W 40/24 | (2009.01) |
| H04W 76/02 | (2009.01) |
| H04W 64/00 | (2009.01) |
| H04W 4/04 | (2009.01) |

(52) U.S. Cl.
CPC ........... *H04W 4/028* (2013.01); *H04W 4/043* (2013.01); *H04W 4/22* (2013.01); *H04W 40/244* (2013.01); *H04W 64/00* (2013.01); *H04W 76/021* (2013.01)

(58) Field of Classification Search
CPC ....... H04W 4/02; H04W 4/021; H04W 4/027; H04W 4/22; H04W 76/007; H04W 4/023; H04M 2242/14; H04M 3/436
USPC ........ 455/404.1, 404.2, 456.1–457; 701/466, 701/513, 519; 340/539.12, 539.13
See application file for complete search history.

(56) References Cited

U.S. PATENT DOCUMENTS

| | | | | |
|---|---|---|---|---|
| 6,021,371 | A * | 2/2000 | Fultz | G01C 21/3608 340/988 |
| 8,688,069 | B1 * | 4/2014 | Cazanas | H04W 4/12 455/404.2 |
| 2004/0033808 | A1 * | 2/2004 | Rorabaugh | G01S 5/0289 455/456.1 |
| 2004/0075553 | A1 * | 4/2004 | Ono | B60R 25/1012 340/539.13 |
| 2004/0239498 | A1 * | 12/2004 | Miller | G08B 25/016 340/539.13 |
| 2007/0287473 | A1 * | 12/2007 | Dupray | H04W 4/02 455/456.1 |

(Continued)

*Primary Examiner* — Allahyar Kasraian
(74) *Attorney, Agent, or Firm* — Michael Johannesen

(57) ABSTRACT

The invention addresses the problem of efficiently locating a target device such as a mobile phone, by directing the movement of moveable wireless beacons along a search pattern, using the target device as a moveable wireless beacon detection device. Preferably, the target device is equipped with a WiFi and/or Bluetooth radio and the moveable wireless beacons are WiFi-equipped and/or Bluetooth-equipped mobile phones in possession of first responders. To locate a target device, the WiFi and/or Bluetooth radios in the moveable wireless beacons are activated such that they transmit a unique identifier. As moveable wireless beacons report their locations and as the target device reports updated beacon detection information, movement directions are determined and sent to the moveable wireless beacons to coordinate an efficient search of the target device. Once at least one moveable wireless beacon is detected by the target mobile phone, updated movement directions are provided to the moveable wireless beacon to direct them toward the target device.

18 Claims, 8 Drawing Sheets

(56) References Cited

U.S. PATENT DOCUMENTS

| | | | |
|---|---|---|---|
| 2009/0043504 A1* | 2/2009 | Bandyopadhyay | G01C 17/38 701/469 |
| 2015/0099544 A1* | 4/2015 | Fay | H04W 4/023 455/456.2 |
| 2015/0230057 A1* | 8/2015 | Jiang | G01S 5/0263 455/404.2 |
| 2016/0112855 A1* | 4/2016 | Goossen | H04W 4/22 455/456.1 |

* cited by examiner

SYSTEM AND METHOD FOR LOCATING A MOBILE PHONE WITH MOVEABLE WIRELESS BEACONS

FIELD OF THE INVENTION

The present invention is directed to location systems, and especially to locating a mobile phone using moveable wireless beacons.

BACKGROUND OF THE INVENTION

A glossary of acronyms and abbreviations associated with emergency services calls is contained in NENA Master Glossary of 9-1-1 Terminology, NENA 00-001, Version 16, dated Aug. 22, 2011 and is incorporated herein by reference in its entirety.

PSAP call takers dispatch emergency assistance such as police, fire, and medical personnel in response to phone calls made to an emergency telephone number which, in the case of the United States, is 9-1-1. For 9-1-1 calls from a traditional wireline phone, the dispatch address is preconfigured and stored in an ALI database. For 9-1-1 calls from a mobile phone, there is no fixed address associated with the mobile phone. To enable PSAP call takers to dispatch emergency assistance to the mobile phone caller, wireless carriers have implemented a variety of location-determining technologies to provide the caller's latitude and longitude (hereafter referred to as "X,Y").

Having accurate caller X,Y is critical for ensuring that first responders arrive at the correct location. The FCC recognized the importance of accurate X,Y in 1996 by adopting rules that required wireless carriers to implement E911 location-determining services. The FCC divided its wireless E911 rules into two stages. The initial stage was called Phase I and required wireless carriers to deliver by April 1998 E911 service that included the caller's telephone number and the location of the cell site or base station that handled the call. The second phase was called Phase II and required delivery, under a phased-in schedule, now extending until January 2019, E911 service that includes X,Y of the mobile phone caller within specific accuracy and reliability parameters, depending on the location technology, as follows:
  (a) Using network-based technologies: within 100 meters for 67 percent of calls, and 300 meters for 90 percent of calls;
  (b) Using handset-based technologies: within 50 meters for 67 percent of calls, and 150 meters for 90 percent of calls.

Despite the FCC rules requiring improvements in location accuracy, there are multiple reasons why an X,Y provided to the PSAP does not result in a useful address for dispatching emergency assistance (hereafter referred to as a "dispatch address"). For some mobile phone calls, only Phase I X,Y is made available to the PSAP. Since Phase I location only identifies the caller's cell site and can have a range as large as 22 miles for GSM technology, the Phase I X,Y provided to the PSAP is not sufficient to determine a dispatch address. For mobile phone calls that are routed to a PSAP with Phase II location, the accuracy of that location is often outside the 100 meter range (or 50 meters for carriers using handset-based technologies). This is a common problem for mobile phones that rely on a handset-based technology such as GPS, since indoor GPS coverage is typically poor due to 1.5 GHz RF propagation properties. An additional cause for dispatch address errors occurs when an X,Y is converted at the PSAP into a dispatch address by using mapping or GIS tools to identify the closest street address to the X,Y. Depending on the precision and accuracy of the X,Y, the area described by the X,Y may cover many street addresses and the center of the area described by the X,Y and its precision may not be the nearest street address to the actual emergency.

The problem of identifying a dispatch address is further exacerbated when an emergency occurs at a building with many rooms or multiple floors, each with many rooms. In these situations, a street address, even if correct, is inadequate. The net result is that first responders arriving at the location to which they are dispatched often face the difficult task of searching for and locating the party who called 9-1-1 before assistance can be rendered.

Prior to this invention, a common approach used by first responders for locating the person who called 9-1-1 was to call the 9-1-1 caller's phone number to get further verbal instructions. However, there are cases when this approach will not work. The party who called 9-1-1 for assistance might have had a medical emergency preventing him or her from answering a follow-up phone call. Or the party who called 9-1-1 might be hiding silently from an intruder or be occupied fighting a fire. Even if the PSAP provided a precise building, floor and room number where the 9-1-1 caller should be located, it is possible that the 9-1-1 caller may have moved to another floor or room in the building to escape an encroaching file or to hide from an intruder. In situations like these, first responders may waste precious time searching for the 9-1-1 caller.

In addition to locating the party requiring assistance, first responders arriving to a dispatch address face a new challenge, known in the industry as 9-1-1 "SWATing". This dangerous practice results in a PSAP call taker being tricked into dispatching an armed SWAT response to an innocent address. To address this new challenge, when armed first responders arrive on scene, they need to ensure they are at the correct location.

There is a need for a system and method to help first responders efficiently search for and locate a 9-1-1 caller.

BRIEF SUMMARY OF THE INVENTION

The present invention addresses the problem of efficiently locating a target mobile phone by directing the movement of moveable wireless beacons, using the 9-1-1 caller's mobile phone as a moveable wireless beacon detection device. In the preferred embodiment, the moveable wireless beacons are WiFi-equipped mobile phones in possession of the first responders. When a first responder seeks to locate a target mobile phone, the WiFi radio in the first responder's mobile phone is activated in WiFi access point mode such that the first responder's mobile phone transmits an Service Set Identifier (SSID). In the preferred embodiment, the 9-1-1 caller's mobile phone is remotely commanded to detect and report the presence of WiFi access points. The server which implements the present invention communicates with the moveable wireless beacons (the first responder mobile phones in the preferred embodiment) and with the target mobile phone, and then sends movement directions to the moveable wireless beacons to efficiently locate the target mobile phone according to a search pattern. In the preferred embodiment, each first responder's mobile phone reports its SSID, MAC Address and location to the server, and the target mobile phone reports any detected WiFi access points, including SSID and MAC Address, and corresponding signal strength to the server. In the preferred embodiment, the server uses the SSID, MAC Address and location of each first responder phone and the SSIDs, MAC Addresses and RF signal strengths detected and reported by the target mobile phone to determine movement directions for each first responder phone. As first responder phones report new locations and as the target mobile phone reports updated detection information, movement directions are updated and sent to the first responder phones. In the preferred embodiment, when the target mobile phone does not detect any first responder phones, the server provides movement directions to the first responder mobile phones according to a search pattern until at least one first responder phone is detected by the target mobile phone. Once at least one first responder phone is detected by the target mobile phone, updated movement directions are provided to first responder mobile phones to direct them towards the target mobile phone.

BRIEF DESCRIPTION OF THE DRAWINGS

The accompanying drawings, which are incorporated into and form a part of the specification, illustrate a preferred embodiment of the present invention and, together with the description, serve to explain the principles of the invention. In the drawings.

DETAILED DESCRIPTION

For purposes of illustration, by way of example and not by way of limitation, the present invention will be discussed in the context of emergency service personnel needing to efficiently locate the mobile phone of a 9-1-1 caller. The teachings of the present invention are equally applicable, useful and novel in other contexts where a mobile phone needs to be located efficiently, such as a campus security team needing to locate the mobile phone of an employee or a search and rescue team needing to locate the mobile phone of a lost hiker in an outdoor environment.

One skilled in the art will recognize that the present invention is not limited to locating mobile phones. By way of example, and not by way of limitation, other wireless devices which may be located by this invention include tablet computers with WiFi, mobile phones with WiFi that are not coupled to a mobile network, laptop computers with WiFi and special purpose electronic devices. It should be understood that references to locating other wireless devices may not be explicitly listed to avoid unnecessary prolixity.

In other embodiments, the mobile phone and other wireless devices are identified by a unique identifier associated with the user or device instead of using a telephone number.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
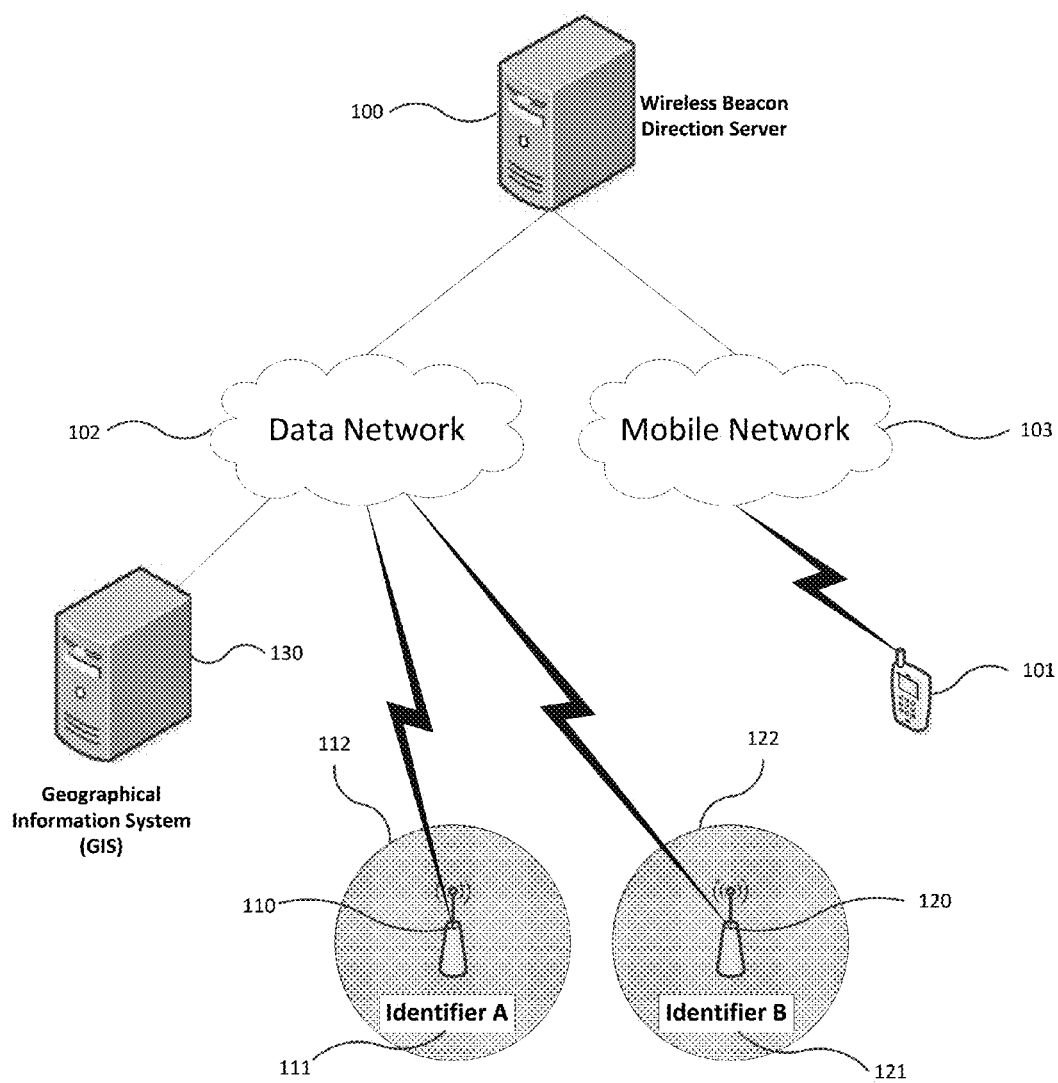
FIG. 1 is a diagram illustrating the environment of the present invention.

FIG. 1 is a diagram illustrating the environment in which the present invention operates. Wireless Beacon Movement Direction Server 100 is coupled to moveable wireless beacons 110 and 120 through data network 102. In the preferred embodiment, moveable wireless beacons 110 and 120 are coupled to data network 102 via WiFi. In an alternative embodiment, moveable wireless beacons 110 and 120 may be coupled to Wireless Beacon Movement Direction Server 100 via mobile network 103.

In the preferred embodiment, Wireless Beacon Movement Direction Server 100 is coupled to target mobile phone 101 via mobile network 103 and sends requests to mobile phone 101 using mobile push notification. One skilled in the art will recognize that examples of mobile push notification technologies include, but are not limited to Apple Push Notification Service, Google Cloud Messaging for Android, Windows Push Notification Services, Microsoft Push Notification Service for Windows Phone, Amazon Device Messaging and Baidu Cloud Push. In an alternative embodiment, Wireless Beacon Movement Direction Server 100 sends requests to mobile phone 101 using mobile push notification via data network 102. In other embodiments, by way of example, and not be way of limitation, Wireless Beacon Movement Direction Server 100 sends requests to mobile phone 101 using Short Message Service (SMS).

Mobile phone 101 sends data to Wireless Beacon Movement Direction Server 100 via mobile network 103. In alternative embodiments, mobile phone 101 sends data to Wireless Beacon Movement Direction Server 100 via data network 102 or by using SMS.

Moveable wireless beacon 110 contains an RF transmitter with coverage area 112 and transmits Identifier A 111. Moveable wireless beacon 120 contains an RF transmitter with coverage area 122 and transmits Identifier B 121. In the preferred embodiment, the RF technology used by mobile phone 101 and moveable wireless beacons 110 and 120 is WiFi. In alternative embodiments, by way of example and not by way of limitation, the RF technology used by mobile phone 101 and moveable wireless beacons 110 and 120 is Bluetooth or Bluetooth LE. In the preferred embodiment using WiFi, Identifier A 111 and Identifier B 121 are at least one of SSID and MAC Address. In the alternative embodiments using Bluetooth or Bluetooth LE, Identifier A 111 and Identifier B 121 are at least one of Device Name, UUID and MAC Address. By way of example and not by way of limitation, two moveable wireless beacons are shown. However, the present invention will operate with one or more moveable wireless beacons. By way of example and not by way of limitation, one target mobile phone is shown. However, the present invention will operate with one or more target mobile phones.

Mobile phone 101 contains an RF receiver that is compatible with the RF transmitter of moveable wireless beacon 110 so that when transmit coverage area 112 overlaps mobile phone 101, mobile phone 101 will couple with moveable wireless beacon 110 and detect Identifier A 111. Similarly, Mobile phone 101 contains an RF receiver that is compatible with the RF transmitter of moveable wireless beacon 120 so that when RF coverage area 122 overlaps mobile phone 101, mobile phone 101 will couple with moveable wireless beacon 120 and will detect Identifier B 121. For the present invention to operate properly, identifiers 111 and 121 are unique.

Other wireless devices can be located by the present invention in the same way as disclosed for mobile phone 101. Like mobile phone 101, other wireless devices need to be capable of coupling with Wireless Beacon Direction Server 100 and capable of coupling with moveable wireless beacons 110 and 120.

Geographical Information System (GIS) 130 is coupled to Wireless Beacon Direction Server 100 to process queries sent from Wireless Beacon Direction Server 100. When queried with a street address or building name, Geographical Information System (GIS) 130 responds with the property boundary as a set of X,Y coordinates.

In the present invention, moveable wireless beacons 110 and 120 incorporate at least the following features: (1) the ability to transmit a unique identifier using an RF signal that is detectable by target mobile phone 101; (2) the ability to report their unique identifier to Wireless Beacon Direction Server 100; (3) the ability to report a track log; and (4) the ability to receive movement directions from Wireless Beacon Direction Server 100. In the preferred embodiment, moveable wireless beacons 110 and 120 are mobile phones operated by first responders and the means of locomotion are the first responders operating the mobile phones. By way of example, and not by way of limitation, a moveable wireless beacon may use a terrestrial robotic device or an unmanned aerial drone as a means of locomotion. The means of locomotion may or may not be permanently attached to the moveable wireless beacon. By way of example, and not be way of limitation, a single first responder may operate multiple mobile phones, each operating as a moveable wireless beacon and the first responder will reposition each such mobile phone as new movement directions are provided by Wireless Beacon Direction Server 100.

Figure 2:
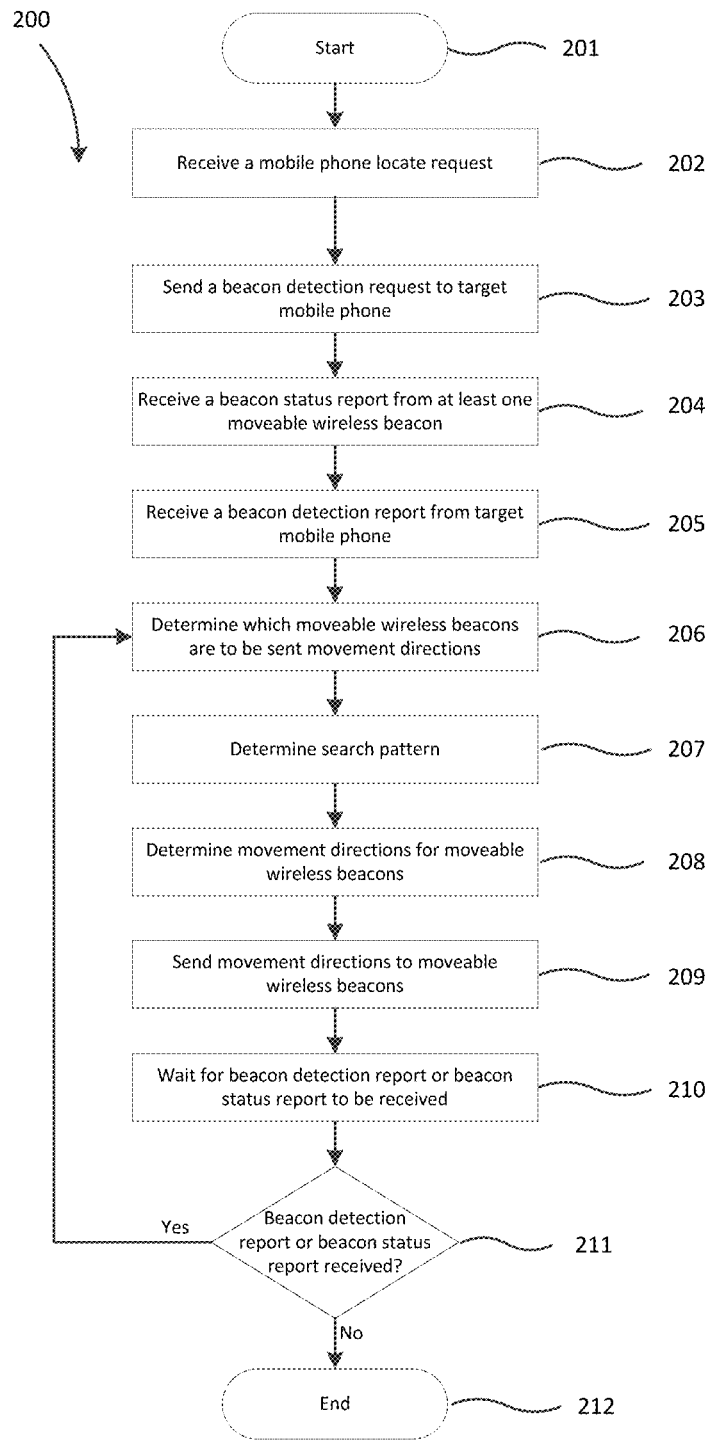
FIG. 2 is a flow chart illustrating the method of the present invention.

FIG. 2 is a flow chart disclosing a method of the present invention. The method starts at step 201 and begins by receiving a mobile phone locate request at step 202. In the preferred embodiment, the mobile phone locate request is received from a first responder phone which has the capabilities of a moveable wireless beacon. In other embodiments, by way of example and not by way of limitation, the mobile phone locate request is received from a party without the capabilities of a moveable wireless beacon such as a mobile wireless data device or via a web user interface on the Wireless Beacon Movement Direction Server 100 in FIG. 1 which is capable of accepting a mobile phone locate request.

In the preferred embodiment, the mobile phone locate request contains the Mobile Station International Subscriber Directory Number (MSISDN) or other telephone number associated with the mobile phone to be located (hereinafter the "target mobile phone") and the coarse location of the target mobile phone.

Coarse location of the mobile phone, by way of example and not by way of limitation, is described in one of the following formats: (1) X,Y coordinates, (2) X,Y coordinates and a radius of accuracy such as provided by Global Positioning System (GPS), (3) X,Y coordinates with an elevation above sea level and a radius of accuracy, (4) a street address, (5) a street address with a building identifier, (6) a street address with a building identifier and a floor identifier, or (7) a street address with a building identifier, a floor identifier and a room identifier. If the coarse location is not in X,Y coordinate format, the coarse location X,Y coordinate is derived using Geographic Information System (GIS) 130 coupled to Wireless Beacon Direction Server 100 via data network 102 shown in FIG. 1. Exemplary embodiments are shown in the tables below:

| Mobile Phone Locate Request #1 | |
| --- | --- |
| MSISDN of target mobile phone | +1.206.555.1234 |
| Coarse location of target mobile phone | Centroid: 38.889523°, −77.035279° |

| Mobile Phone Locate Request #2 | |
| --- | --- |
| MSISDN of target mobile phone | +1.206.555.1234 |
| Coarse location of target mobile phone | Centroid: 38.889523°, −77.035279°<br>Radius: +/−1000 feet |

| Mobile Phone Locate Request #3 | |
| --- | --- |
| MSISDN of target mobile phone | +1.206.555.1234 |
| Coarse location of target mobile phone | Centroid: 38.889523°, −77.035279°<br>Radius: +/−1000 feet<br>Elevation: 150 feet |

| Mobile Phone Locate Request #4 | |
| --- | --- |
| MSISDN of target mobile phone | +1.206.555.1234 |
| Coarse location of target mobile phone | 123 Main St, Denver, CO |

| Mobile Phone Locate Request #5 | |
| --- | --- |
| MSISDN of target mobile phone | +1.206.555.1234 |
| Coarse location of target mobile phone | 123 Main St, Denver, CO<br>Building 2 |

| Mobile Phone Locate Request #6 | |
| --- | --- |
| MSISDN of target mobile phone | +1.206.555.1234 |
| Coarse location of target mobile phone | 123 Main St, Denver, CO<br>Building 2<br>Floor 3 |

| Mobile Phone Locate Request #7 | |
|---|---|
| MSISDN of target mobile phone | +1.206.555.1234 |
| Coarse location of target mobile phone | 123 Main St, Denver, CO Building 2 Floor 3 Room 303 |

In other embodiments, the mobile phone locate request contains a unique identifier associated with a user or a user's device instead of using a telephone number.

In other embodiments, by way of example and not by way of limitation, the mobile phone locate request also contains at least one of: (1) a search boundary in which the target mobile phone is expected to be found, (2) a search pattern name, and (3) a list of identifiers of moveable wireless beacons which are participating in locating the target mobile phone.

The search boundary, by way of example and not by way of limitation, is described in one of the following formats: (1) as a circle with an X,Y coordinate as the centroid and a distance value as the radius of the circle, (2) as a two dimensional polygon with a set of three or more X,Y coordinates corresponding to the vertices of the polygon, (3) as a three dimensional polygonal volume with a set of X,Y,Z coordinates, or (4) as a street address or building identifier from which a set of X,Y coordinates is derived using Geographic Information System (GIS) 130 coupled to Wireless Beacon Direction Server 100 via data network 102 shown in FIG. 1. The embodiments are shown further in the exemplary tables below:

| Mobile Phone Locate Request #8 | |
|---|---|
| MSISDN of target mobile phone | +1.206.555.1234 |
| Coarse location of target mobile phone | Centroid: 38.889523°, −77.035279° Radius: +/−1000 feet |
| Search boundary | Boundary shape: circle Centroid: 38.889523°, −77.035279° Radius: 2000 feet |

| Mobile Phone Locate Request #9 | |
|---|---|
| MSISDN of target mobile phone | +1.206.555.1234 |
| Coarse location of target mobile phone | 38.889523°, −77.035279° +/−1000 feet |
| Search boundary | Boundary shape: polygon vertex: 38.887919°, −77.039504° vertex: 38.892051°, −77.039450° vertex: 38.891954°, −77.032021° vertex: 38.887553°, −77.032024° |

| Mobile Phone Locate Request #10 | |
|---|---|
| MSISDN of target mobile phone | +1.206.555.1234 |
| Coarse location of target mobile phone | 38.889523°, −77.035279° +/−1000 feet |
| Search boundary | Boundary shape: polygonal volume vertex: 38.887919°, −77.039504°, 0 vertex: 38.892051°, −77.039450°, 0 vertex: 38.891954°, −77.032021°, 0 vertex: 38.887553°, −77.032024°, 0 |

| Mobile Phone Locate Request #10 (continued) | |
|---|---|
| | vertex: 38.887919°, −77.039504°, 100 m vertex: 38.892051°, −77.039450°, 100 m vertex: 38.891954°, −77.032021°, 100 m vertex: 38.887553°, −77.032024°, 100 m |

| Mobile Phone Locate Request #11 | |
|---|---|
| MSISDN of target mobile phone | +1.206.555.1234 |
| Coarse location of target mobile phone | 123 Main St, Denver, CO Building 2 Floor 3 Room 303 |
| Search boundary | Building at address: 123 Main St, Denver, CO |

If the coarse location format received in a mobile phone request is a street address or building identifier and a search boundary is not included in the mobile phone request, a search boundary is derived using Geographic Information System (GIS) 130 coupled to Wireless Beacon Direction Server 100 via data network 102 shown in FIG. 1.

A search pattern defines a template for the path to be followed by the moveable wireless beacons. The search pattern name that is used in the mobile phone locate request is chosen from a set of pre-configured search pattern names supported by the present invention. By way of example, and not by way of limitation, the set of pre-configured search pattern names includes: (1) inward spiral, (2) outward spiral, (3) parallel grid movement, (4) inward sweep, (5) outward sweep, (6) floor-by-floor bottom up, (7) floor-by-floor top down, (8) inward circular sector, and (9) outward circular sector. One skilled in the art of search and rescue will recognize that a search pattern should be chosen by the party who initiates the locate event after evaluating the physical environment of the locate event and other factors such as the number of participating moveable wireless beacons, the likelihood that the target is moving, the presence of visual or structural obstacles and the tradeoff of speed versus thoroughness of the search.

Figure 3:
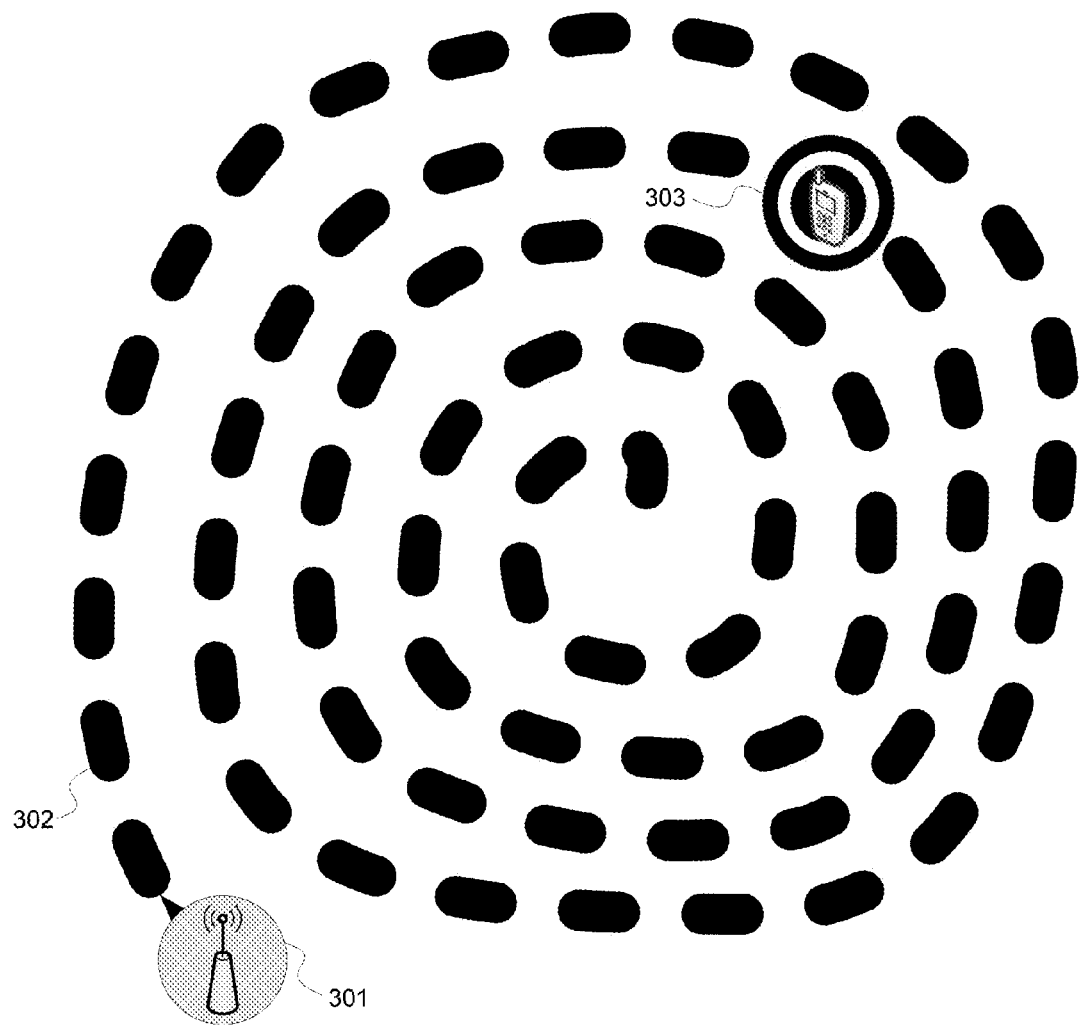
FIG. 3 illustrates an inward spiral search pattern using one moveable wireless beacon.
Figure 4:
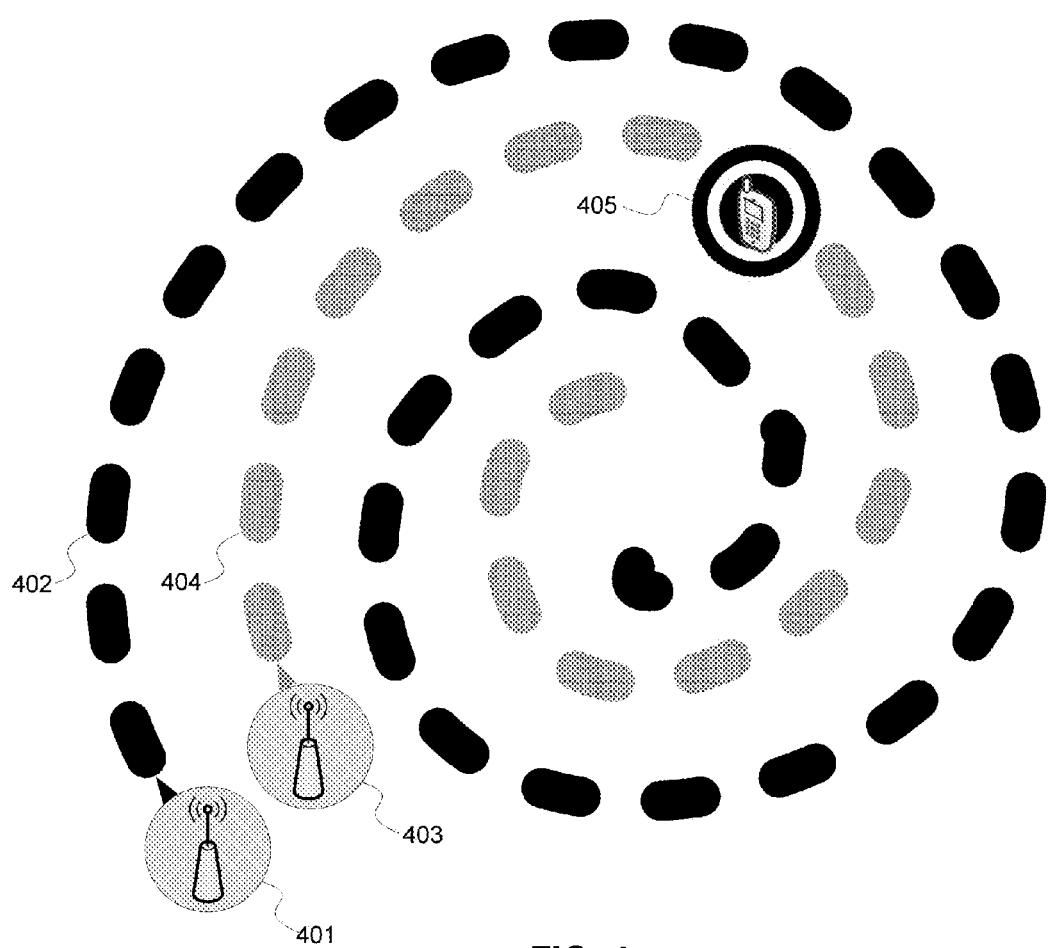
FIG. 4 illustrates an inward spiral search pattern using two moveable wireless beacons.
Figure 5:
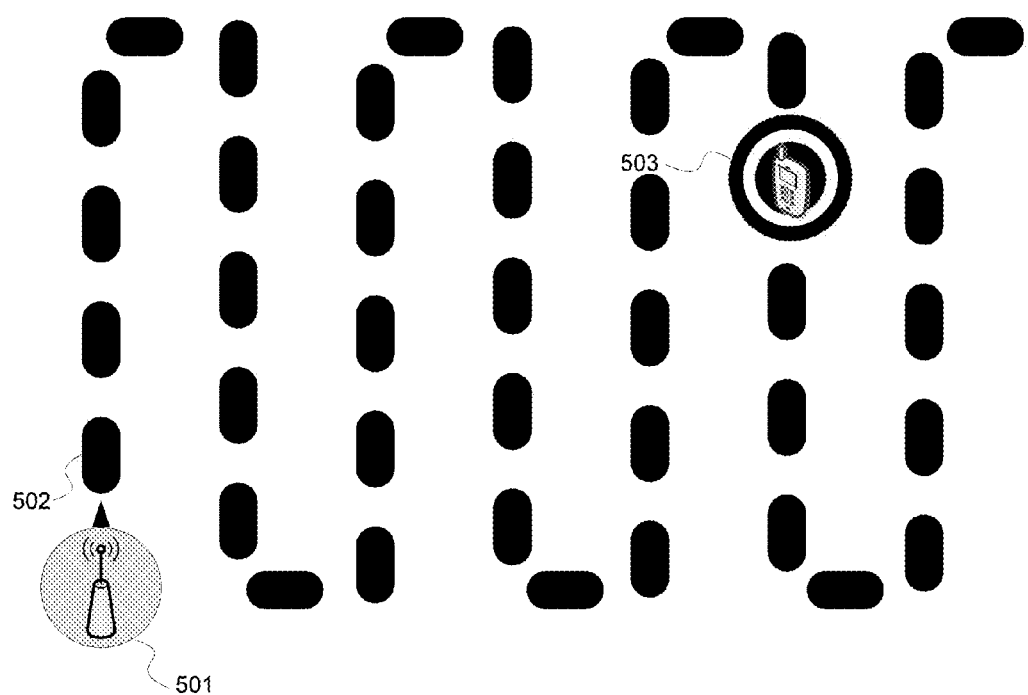
FIG. 5 illustrates an inward sweep search pattern using one moveable wireless beacon.
Figure 6:
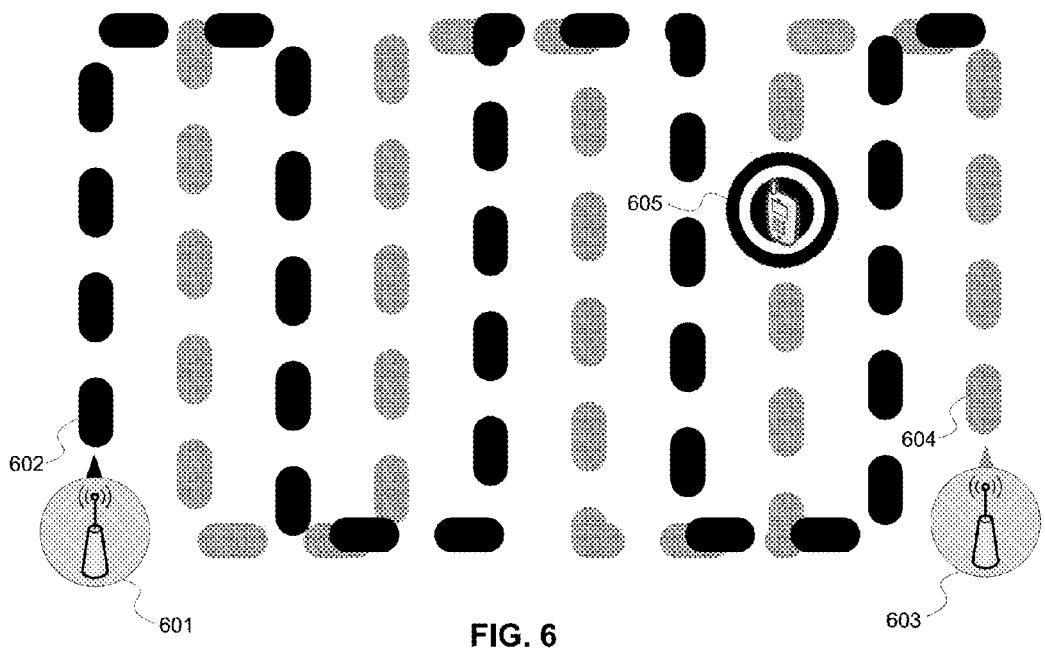
FIG. 6 illustrates an inward sweep search pattern using two moveable wireless beacons.
Figure 7:
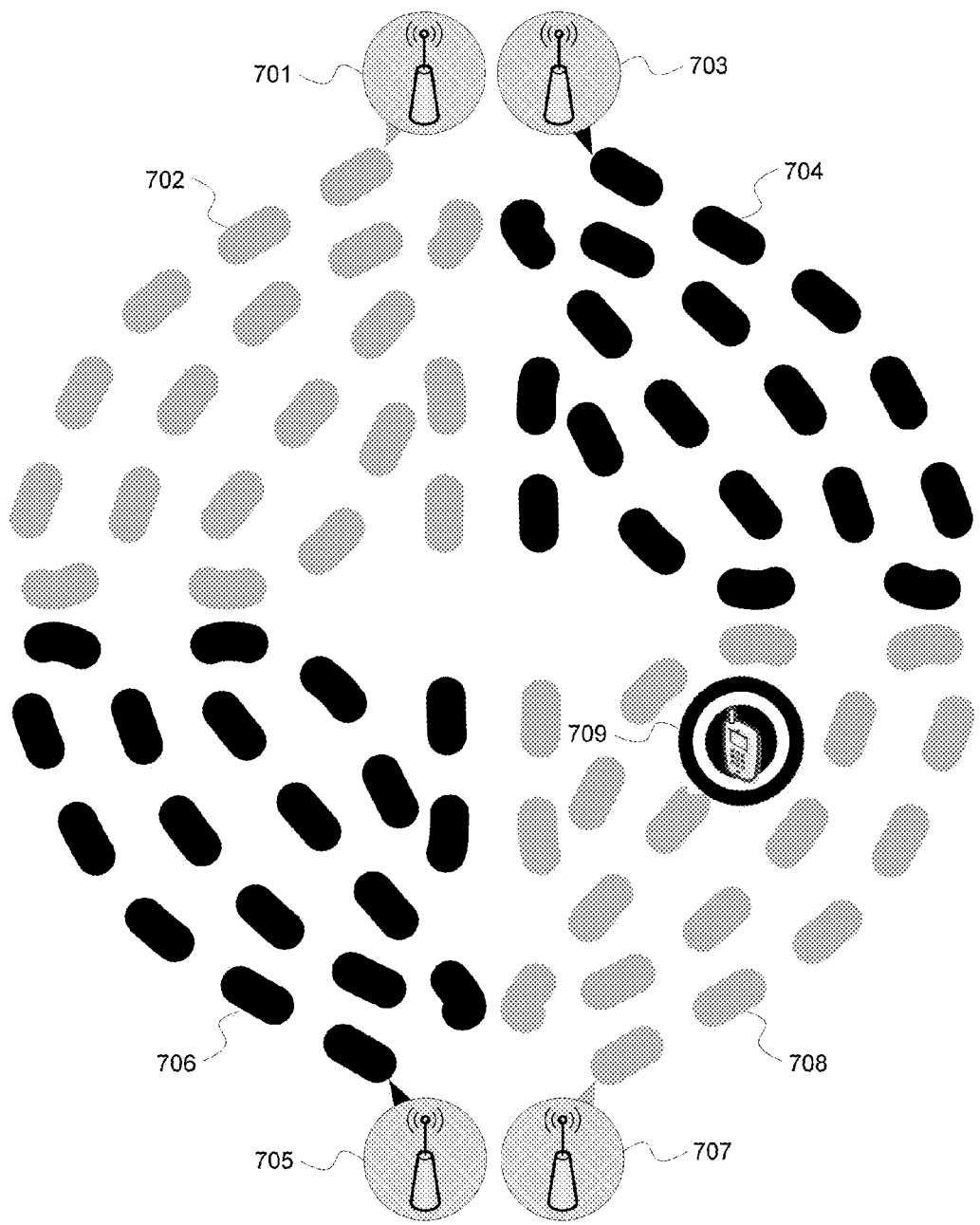
FIG. 7 illustrates an inward circular sector search pattern using four moveable wireless beacons.

Search pattern 302 depicted in FIG. 3 illustrates an inward spiral search pattern using one moveable wireless beacon. Search patterns 402 and 404 depicted in FIG. 4 illustrate an inward spiral search pattern using two moveable wireless beacons. Search pattern 502 depicted in FIG. 5 illustrates an inward sweep search pattern using one moveable wireless beacon. Search patterns 602 and 604 depicted in FIG. 6 illustrate an inward sweep search pattern using two moveable wireless beacons. Search patterns 702, 704, 706 and 708 depicted in FIG. 7 illustrate an inward circular sector search pattern using four moveable wireless beacons. A novel aspect of this method is the flexibility and searching efficiency of selecting among multiple search patterns and then coordinating wireless beacon movements according to the selected search pattern.

For one skilled in the art of search and rescue, the use of search patterns and their pattern shapes are understood. The embodiments are shown further in the exemplary tables below:

| Mobile Phone Locate Request #12 | |
| --- | --- |
| MSISDN of target mobile phone | +1.206.555.1234 |
| Coarse location of target mobile phone | Centroid: 38.889523°, −77.035279° Radius: +/−1000 feet |
| Search Pattern | Inward spiral |

| Mobile Phone Locate Request #13 | |
| --- | --- |
| MSISDN of target mobile phone | +1.206.555.1234 |
| Coarse location of target mobile phone | 38.889523°, −77.035279° Radius: +/−1000 feet |
| Search Pattern | Outward spiral |

| Mobile Phone Locate Request #14 | |
| --- | --- |
| MSISDN of target mobile phone | +1.206.555.1234 |
| Coarse location of target mobile phone | 38.889523°, −77.035279° Radius: +/−1000 feet |
| Search boundary | Boundary shape: polygon vertex: 38.887919°, −77.039504° vertex: 38.892051°, −77.039450° vertex: 38.891954°, −77.032021° vertex: 38.887553°, −77.032024° |
| Search Pattern | Parallel grid movement |

| Mobile Phone Locate Request #15 | |
| --- | --- |
| MSISDN of target mobile phone | +1.206.555.1234 |
| Coarse location of target mobile phone | 123 Main St, Denver, CO Building 2 Floor 3 Room 303 |
| Search Pattern | Inward Sweep |

| Mobile Phone Locate Request #16 | |
| --- | --- |
| MSISDN of target mobile phone | +1.206.555.1234 |
| Coarse location of target mobile phone | 38.889523°, −77.035279° Radius: +/−1000 feet |
| Search Pattern | Outward Sweep |

| Mobile Phone Locate Request #17 | |
| --- | --- |
| MSISDN of target mobile phone | +1.206.555.1234 |
| Coarse location of target mobile phone | Centroid: 38.889523°, −77.035279° radius: +/−1000 feet |
| Search boundary | Boundary shape: circle Centroid: 38.889523°, 77.035279° Radius: 2000 feet |
| Search Pattern | Floor-by-floor, bottom up |

| Mobile Phone Locate Request #18 | |
| --- | --- |
| MSISDN of target mobile phone | +1.206.555.1234 |
| Coarse location of target mobile phone | Centroid: 38.889523°, −77.035279° Radius: +/−1000 feet |
| Search boundary | Building at address: 2 15th St NW, Washington, DC 20007 |
| Search Pattern | Floor-by-floor, top down |

The embodiments including a list of identifiers of moveable wireless beacons which are participating in locating the target mobile phone are shown further in the exemplary tables below:

| Mobile Phone Locate Request #19 | |
| --- | --- |
| MSISDN of target mobile phone | +1.206.555.1234 |
| Coarse location of target mobile phone | Centroid: 38.889523°, −77.035279° Radius: +/−1000 feet |
| Moveable Wireless beacon identifiers | MAC #1: 8C:E1:AC:37:74:22 MAC #2 D3:E3:DD:37:74:33 MAC #3: B2:E6:ED:37:74:44 |

| Mobile Phone Locate Request #20 | |
| --- | --- |
| MSISDN of target mobile phone | +1.206.555.1234 |
| Coarse location of target mobile phone | 123 Main St, Denver, CO Building 2 Floor 3 Room 303 |
| Search boundary | Boundary shape: circle Centroid: 38.889523°, −77.035279° Radius: 2000 feet |
| Search Pattern | Inward spiral |
| Moveable Wireless beacon identifiers | SSID #1: Firefighter Badge 12345 SSID #2: Firefighter Badge 12346 SSID #3: Patrolman Badge 55123 |

| Mobile Phone Locate Request #21 | |
| --- | --- |
| MSISDN of target mobile phone | +1.206.555.1234 |
| Coarse location of target mobile phone | 38.889523°, −77.035279° +/−1000 feet |
| Moveable Wireless beacon identifiers | SSID #1: Firefighter Badge 12345 MAC #1: 8C:E1:AC:37:74:22 SSID #2: Firefighter Badge 12346 MAC #2 D3:E3:DD:37:74:33 SSID #3: Patrolman Badge 55123 MAC #3: B2:E6:ED:37:74:44 |

Returning to FIG. 2, the method continues at step 203 by sending a beacon detection request to the target mobile phone. A beacon detection request is a request to the target mobile phone to send at least one beacon detection report.

In the preferred embodiment, the beacon detection request includes an indicator for the target mobile phone to immediately send a beacon detection report and thereafter, to automatically send a beacon detection report whenever the target mobile phone identifies a change in detected wireless beacons.

In another embodiment, by way of example and not by way of limitation, the beacon detection request includes a time value between 1 second and 5 minutes for the target mobile phone to periodically send a beacon detection report.

In another embodiment, by way of example and not by way of limitation, the beacon detection request includes a report expiration time value between one minute and 12 hours. After the expiration time is reached, the target mobile phone stops sending beacon detection reports.

The method continues at step 204 by receiving a beacon status report from at least one moveable wireless beacon. In the preferred embodiment, the beacon status report includes the identifier of a moveable wireless beacon and the track log of the moveable wireless beacon, represented by a set of X,Y coordinates and timestamps. This embodiment is shown in the exemplary table below:

| Beacon Status Report #1 | |
|---|---|
| Moveable Wireless Beacon Identifier | SSID#1: Firefighter badge 12345<br>MAC #1: 2C:B0:5D:83:01:D3 |
| Track Log | 11/02/2014, 20:41:36.59, 38.887919°, −77.039504°<br>11/02/2014, 20:41:37.59, 38.888919°, −77.039504°<br>11/02/2014, 20:41:38.59, 38.889919°, −77.039504° |

In the preferred embodiment, a moveable wireless beacon clears its track log after sending a beacon status report. In an alternative embodiment, a moveable wireless beacon retains its track log for a period of time and/or a number of track log entries so that duplicate entries are received which are filtered out based on matching track log timestamp values.

The WiFi SSID and MAC address are the elements of the identifier transmitted by a moveable wireless beacon which uses WiFi RF technology. In the alternative embodiments using Bluetooth or Bluetooth LE, the Device Name, UUID and MAC Address are the elements of the identifier transmitted by a moveable wireless beacon. These elements may be detected by the target mobile phone and reported in a beacon detection report.

In other embodiments, by way of example and not by way of limitation, the beacon status report also includes at least one of: (1) target mobile phone/user/device identifier, (2) transmit power of the moveable wireless beacon, and (3) a designated recipient for moveable wireless beacon movement directions. The target mobile phone/user/device identifier is included in the beacon status report so that the method adds or continues to include the reporting moveable wireless beacon in the set of moveable wireless beacons participating in the locate event for the target mobile phone/device. Receipt of a beacon status report without an identifier that previously sent a beacon status report with an identifier indicates the moveable wireless beacon is no longer participating in the locate event for the target mobile phone/device. If the transmit power of the moveable wireless beacon is included in a beacon status report, the method estimates the RF coverage area of the moveable wireless beacon based on the transmit power. Estimating RF coverage area from a given transmit power are known to one skilled in the art. If a transmit power is not included in a beacon status report, the method relies on a pre-configured RF coverage area. These embodiments are shown in the exemplary tables below:

| Beacon Status Report #2 | |
|---|---|
| Moveable Wireless Beacon Identifier | SSID#1: Firefighter badge 12345<br>MAC #1: 2C:B0:5D:83:01:D3 |
| Track Log | 11/02/2014, 20:41:36.59, 38.887919°, −77.039504°<br>11/02/2014, 20:41:37.59, 38.888919°, −77.039504°<br>11/02/2014, 20:41:38.59, 38.889919°, −77.039504° |
| Target mobile phone | +1.206.555.1234 |

| Beacon Status Report #3 | |
|---|---|
| Moveable Wireless Beacon Identifier | SSID#1: Firefighter badge 12345<br>MAC #1: 2C:B0:5D:83:01:D3 |
| Target mobile phone | +1.206.555.1234 |
| Track Log | 11/02/2014, 20:41:36.59, 38.887919°, −77.039504°<br>11/02/2014, 20:41:37.59, 38.888919°, −77.039504°<br>11/02/2014, 20:41:38.59, 38.889919°, −77.039504° |
| Transmit Power | −30 dBm |

| Beacon Status Report #4 | |
|---|---|
| Moveable Wireless Beacon Identifier | SSID#1: Firefighter badge 12345<br>MAC #1: 2C:B0:5D:83:01:D3 |
| Track Log | 11/02/2014, 20:41:36.59, 38.887919°, −77.039504°<br>11/02/2014, 20:41:37.59, 38.888919°, −77.039504°<br>11/02/2014, 20:41:38.59, 38.889919°, −77.039504° |
| Target mobile phone | +1.206.555.1234 |
| Transmit Power | −30 dBm |

| Beacon Status Report #5 | |
|---|---|
| Moveable Wireless Beacon Identifier | SSID#1: Firefighter badge 12345<br>MAC #1: 2C:B0:5D:83:01:D3 |
| Track Log | 11/02/2014, 20:41:36.59, 38.887919°, −77.039504°<br>11/02/2014, 20:41:37.59, 38.888919°, −77.039504°<br>11/02/2014, 20:41:38.59, 38.889919°, −77.039504° |
| Target mobile phone | +1.206.555.1234 |
| Designated Recipient | firefighter_12345@city.gov |

The method continues at step 205 by receiving a beacon detection report from the target mobile phone. The present invention places no requirements on the mobile phone to differentiate between non-participating beacons as well as participating beacons. As a result, a beacon detection report may include non-participating beacons as well as participating beacons. In the preferred embodiment, the beacon detection report includes the mobile phone's MSISDN, timestamp, and for each detected RF beacon, the RF beacon identifier and the received signal strength indicator (RSSI). This embodiment is shown in the exemplary table below:

| Beacon Detection Report #1 | |
|---|---|
| Mobile phone MSISDN | +1.206.555.1234 |
| Timestamp | 11/02/2014, 20:41:36.59 |
| WiFi Access Point #1 | SSID: Firefighter badge 12345<br>MAC: 2C:B0:5D:83:01:D3<br>RSSI: −70 dB |
| WiFi Access Point #2 | SSID: Firefighter badge 12346<br>MAC: 2F:B9:11:D3:F1:D1<br>RSSI: −40 dB |
| WiFi Access Point #3 | SSID #3: Patrolman Badge 55123<br>MAC #3: B2:E6:ED:37:74:44<br>RSSI: −30 dBm |

In other embodiments, the beacon detection report includes a unique identifier associated with the mobile phone or device.

In another embodiment, by way of example and not by way of limitation, the beacon detection report also includes the location of the mobile phone. This embodiment is shown in the exemplary table below:

| Beacon Detection Report #2 | |
| --- | --- |
| Mobile phone MSISDN | +1.206.555.1234 |
| Timestamp | 11/02/2014, 20:41:36.59 |
| WiFi Access Point #2 | SSID: Firefighter badge 12345<br>MAC: 2C:B0:5D:83:01:D3<br>RSSI: −70 dB |
| WiFi Access Point #3 | SSID: Firefighter badge 12346<br>MAC: 2F:B9:11:D3:F1:D1<br>RSSI: −40 dB |
| WiFi Access Point #3 | SSID #3: Patrolman Badge 55123<br>MAC #3: B2:E6:ED:37:74:44<br>RSSI: −30 dBm |
| Mobile Phone Location | 38.887919°, −77.039504° |

The method continues at step 206 by determining which moveable wireless beacons are to be sent movement directions. For one skilled in the art, it should be understood that the system supports simultaneous location events and that the set of beacons associated with a single location event may change over time by new beacons being added to the search or existing beacons no longer participating in the search. The set of moveable wireless beacons which are to be sent movement directions in the locate event for a particular target mobile phone, are hereafter called "participating beacons".

In the preferred embodiment, the set of participating beacons includes all moveable wireless beacons that are within or proximate to the search boundary specified in the mobile phone locate request received in step 202. The determination of "proximate to" is made by comparing the location of each moveable wireless beacon, as last reported in its most recent beacon status report, to the search boundary specified in the mobile phone locate request. If no search boundary was specified in the mobile phone locate request, the determination of "proximate to" is made by comparing the location of each moveable wireless beacon, as last reported in its most recent beacon status report, to the coarse location of the target mobile phone. Each wireless beacon that is within a pre-configured distance of the search boundary or the coarse location of the target mobile phone will be included in the set of participating beacons. As subsequent beacon status reports are received, the determination of "proximate to" is re-evaluated and moveable wireless beacons are added to or removed from the set of participating beacons accordingly.

In another embodiment, the method adds, or continues to include, a moveable wireless beacon to the set of participating beacons of the locate event for the target mobile phone identified in the mobile phone locate request that was received in step 202 if the beacon status report received in step 204 includes the phone number of the target mobile phone identified in the mobile phone locate request. In this embodiment, subsequent receipt of a beacon status report that includes no MSISDN or a different MSISDN from a moveable wireless beacon that is currently in the set of participating beacons will cause the moveable wireless beacon to be removed from the set of participating beacons. In other embodiments, a unique identifier associated with the mobile phone or device is used instead of the MSISDN.

As described in step 202, in another embodiment the mobile phone locate request can include a list of identifiers associated with the moveable wireless beacons which are participating in locating the target mobile phone. In this embodiment, moveable wireless beacons may be added or removed from the set of participating beacons if a subsequent mobile phone locate request is received containing a different list of moveable wireless beacons.

The method continues at step 207 by determining a search pattern. A search pattern specifies a template for wireless beacon movement. Initially, the search pattern is either received in a mobile phone locate request as described in step 202 or an initial search pattern is assigned based on a pre-configured lookup table, according to the following parameters: (1) number of participating beacons as determined in step 206, and (2) an indicator if the search boundary is defined, either explicitly included in a mobile phone locate request or derived from the coarse location. An exemplary search pattern lookup table is shown below:

| Search Pattern Lookup Table | | |
| --- | --- | --- |
| Participating Beacons | Search Boundary | Search Pattern |
| 1 | Yes | Inward spiral |
| 2 | Yes | Inward sweep |
| >2 | Yes | Inward circular sector |
| 1 | No | Outward spiral |
| 2 | No | Outward sweep |
| >2 | No | Outward circular sector |

Subsequent to determining the initial search pattern, the search pattern is updated on the following conditions: (1) if a mobile phone locate request is received with a different search pattern, or (2) if the number of participating beacons or search boundary status changes, and the search pattern lookup table indicates a different search pattern with priority given to the search pattern specified in the mobile phone locate request. The estimated mobile phone location remains the same, regardless of search pattern changes.

The method continues at step 208 by determining movement directions for the participating beacons according to the search pattern determined in step 207. In this step, the search pattern template is positioned geographically and scaled, with the center of the search pattern set to the estimated target phone location and the scale of the search pattern defined the search boundary. If the search boundary is not defined, a pre-configured default is used. Although it is beyond the scope of the present invention, when a search boundary is not defined, it is envisioned that an outward search pattern would be specified in a mobile phone locate request or pre-configured. In this case, method initially uses the coarse location of the mobile phone received in the mobile phone locate request as the estimated target phone location. The method then refines the estimated location of the target phone using the data received in beacon detection reports and beacon status reports, with the data correlated based on received timestamps.

When a beacon status report is received, the method determines a set of movement directions based on the beacon's current location so that the beacon is positioned to follow the search pattern, homing in on the estimated mobile phone location. The track log received in the beacon status report indicates search pattern progress. A novel aspect of this invention is determining movement directions to maximize the searched coverage area (while the target mobile phone has not yet reported the detection of a participating beacon) by efficiently directing beacon movement into unsearched areas so that the RF coverage area of each participating beacon does not substantially overlap a previously searched area or the RF coverage area of other participating beacons.

When a beacon detection report is received, the RSSI of detected participating beacons in the beacon detection report, if provided, and the location of the detected participating beacons in the corresponding beacon status reports is used to calculate an estimated location of the target mobile phone. If two or more participating beacon identifiers with corresponding RSSI values are contained in the beacon detection report, triangulation techniques, known to one skilled in the art, along with the location of the detected participating beacons as reported in corresponding beacon status reports, are used to calculate a more precise estimate of the target mobile phone location. This triangulated location provides a more precise estimated location of the target mobile phone. Also from the beacon detection report, the mobile phone location, if provided, is used to estimate the location of the target mobile phone.

In the preferred embodiment for movement directions, movement directions are formatted as a route consisting of one or more X,Y coordinates and an elevation. For one familiar with navigation terminology, these X,Y coordinates represent waypoints along a route (i.e., the search pattern). When the proximate distance between the location of at least one participating beacon and the estimated location of the target mobile phone reaches a pre-configured threshold, the method determines the target mobile phone has been successfully located. The default proximate distance is 10 feet, but can be configured to range from one foot to 1000 feet. When a target mobile phone has been successfully located by at least one participating beacon, updated movement directions are sent to the other participating beacons. Similarly, if a beacon status report is received and the beacon's current location is misaligned to the search pattern, updated movement directions are sent to the "wayward" beacon to realign the beacon to the search pattern. Formats for updated movement directions include the following: (a) a direction to follow a path described by at least one straight line vector (b) a direction to follow a path described by at least one curve; (c) a direction to go to at least one X,Y coordinate; (d) a direction to follow a path described by at least one textual description; (e) a direction to go to a specified moveable wireless beacon; and (f) a direction to go to the estimated location of the target phone.

The method continues at step 209 where the beacon movements are sent to the moveable wireless beacons. In embodiments where a moveable wireless beacon is a WiFi-equipped mobile phone or Bluetooth-equipped mobile phone operated by a first responder, movement directions are sent to the sender of the beacon status report. In alternative embodiments where a moveable wireless beacon is a terrestrial robotic device or an unmanned aerial drone, movement directions are sent to the moveable wireless beacon.

In other embodiments, movement directions are sent to a designated recipient, preferably via e-mail. For example, a single first responder may operate multiple mobile phones, each operating as a moveable wireless beacon with movement directions sent to the first responder so that he/she can reposition each mobile phone as new movement directions are received. In other embodiments, by way of example, and not be way of limitation, a designated recipient is identified by a user identifier or device identifier.

The method continues at step 210 by waiting a pre-configured amount of time to receive either a beacon detection report or beacon status report. The default timeout period is 10 minutes, but can be configured to range from one minute to one hour.

At step 211, if either a beacon detection report or beacon status report is received the method repeats steps 206 through 210. When beacon detection reports and beacon status reports are no longer being received, the method ends at step 211.

FIG. 3 illustrates moveable wireless beacon 301 following inward spiral search pattern 302 to locate target mobile phone 303. As described in step 205 of FIG. 2, when moveable wireless beacon 301 is within RF reception range of target mobile phone 303, target mobile phone 303 sends a beacon detection report identifying moveable wireless beacon 301. As described in step 208 of FIG. 2, the approximate location of target mobile phone 303 is determined from the track log X,Y coordinates sent in a beacon status report from moveable wireless beacon 301 with a timestamp value closest to the timestamp value in the beacon detection report.

FIG. 4 illustrates moveable wireless beacons 401 and 403 following inward spiral search patterns 402 and 404, respectively, to locate target mobile phone 405. As described in step 205 of FIG. 2, when moveable wireless beacon 403 is within RF reception range of target mobile phone 405, target mobile phone 405 sends a beacon detection report identifying moveable wireless beacon 403. As described in step 208 of FIG. 2, the approximate location of target mobile phone 405 is determined from the track log X,Y coordinates sent in a beacon status report from moveable wireless beacon 403 with a timestamp value closest to the timestamp value in the beacon detection report.

FIG. 5 illustrates moveable wireless beacon 501 following inward sweep search pattern 502 to locate target mobile phone 503. As described in step 205 of FIG. 2, when moveable wireless beacon 501 is within RF reception range of target mobile phone 503, target mobile phone 503 sends a beacon detection report identifying moveable wireless beacon 501. As described in step 208 of FIG. 2, the approximate location of target mobile phone 503 is determined from the track log X,Y coordinates sent in a beacon status report from moveable wireless beacon 501 with a timestamp value closest to the timestamp value in the beacon detection report.

FIG. 6 illustrates moveable wireless beacons 601 and 603 following inward sweep search patterns 602 and 604, respectively, to locate target mobile phone 605. As described in step 205 of FIG. 2, when moveable wireless beacon 603 is within RF reception range of target mobile phone 605, target mobile phone 605 sends a beacon detection report identifying moveable wireless beacon 603. As described in step 208 of FIG. 2, the approximate location of target mobile phone 605 is determined from the track log X,Y coordinates sent in a beacon status report from moveable wireless beacon 603 with a timestamp value closest to the timestamp value in the beacon detection report.

FIG. 7 illustrates moveable wireless beacons 701, 703, 705 and 707 following inward circular sector search patterns 702, 704, 706 and 708 consisting of multiple waypoints, respectively, to locate target mobile phone 709. As described in step 205 of FIG. 2, when moveable wireless beacon 707 is within RF reception range of target mobile phone 709, target mobile phone 709 sends a beacon detection report identifying moveable wireless beacon 707. As described in step 208 of FIG. 2, the approximate location of target mobile phone 709 is determined from the track log X,Y coordinates sent in a beacon status report from moveable wireless beacon 707 with a timestamp value closest to the timestamp value in the beacon detection report.

Figure 8:
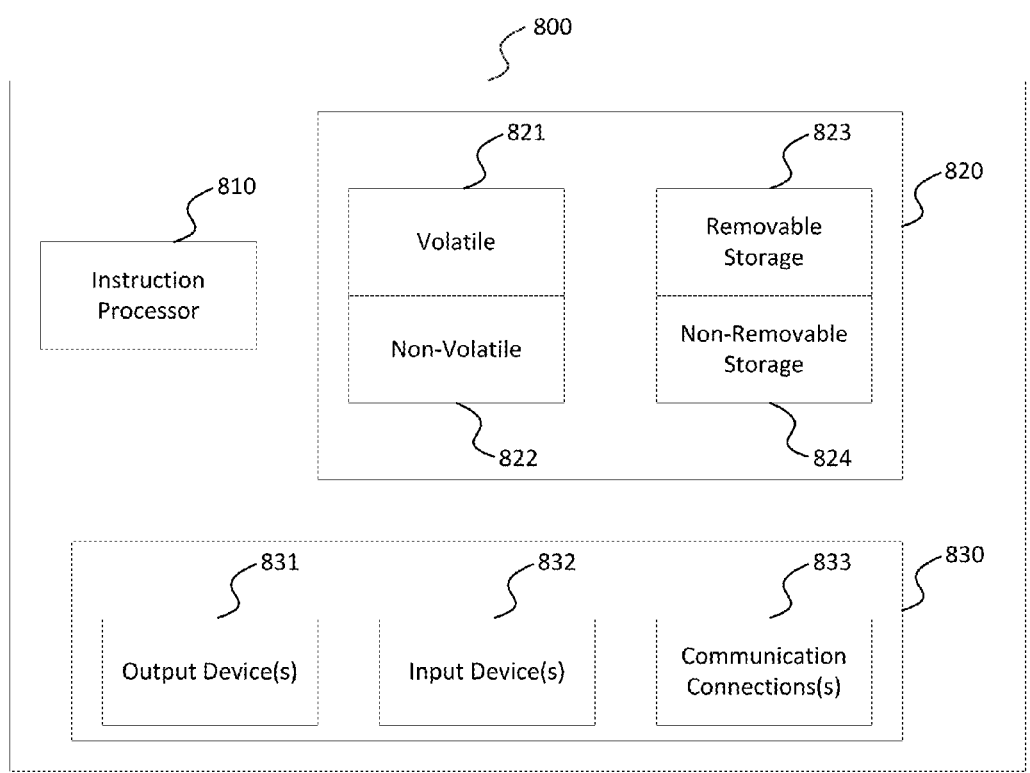
FIG. 8 is a block diagram of an example processor for effecting the present invention.

Turning now to FIG. 8, example processor 800 is a block diagram of a processor in accordance with this invention. It is emphasized that the block diagram depicted in FIG. 8 is exemplary and not intended to imply a specific implementation. Thus, the processor 800 can be implemented in a single processor or multiple processors. Multiple processors can be distributed or centrally located. Multiple processors can communicate wirelessly, via hard wire, or any combination thereof.

The processor 800 comprises an instruction processor 810, a memory 820, and an input/output 830. The instruction processor unit 810, memory 820, and input/output 830 are coupled together (coupling not shown in FIG. 8) to allow communication among each other. The input/output 830 is capable of receiving mobile phone locate requests, beacon status reports and beacon detection reports. The input/output 830 is also capable of sending beacon detection requests and beacon movement directions.

The processor 800 is preferably implemented as a client processor and/or a server processor. In a basic configuration, the processor 800 includes at least one instruction processor 810 and memory 820. The memory 820 stores any information utilized in conjunction with sending, receiving, and/or processing mobile phone locate requests, beacon status reports, beacon detection reports, beacon detection requests and beacon movement directions. Preferentially, the memory stores mobile phone locate request data, beacon detection data, beacon status data and mobile phone location data in a database. Depending upon the configuration and type of processor, the memory 820 can be volatile (such as RAM) 821, non-volatile (such as ROM, flash memory, etc.) 822, or a combination thereof. The processor 800 can have additional features/functionality. For example, the processor 800 can include additional storage (removable storage 823 and/or non-removable storage 824) including, but not limited to, magnetic or optical disks, tape, flash, smart cards or a combination thereof. Computer storage media, such as memory and storage elements 820, 821, 822, 823 and 824, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 800. Any such computer storage media may be part of the processor 800.

The processor 800 includes the communications connection(s) 833 that allow the processor 800 to communicate with other devices, for example with beacons 110 and 120 via data network 102 as illustrated in FIG. 1 and with mobile phone 101 via data network 102 and mobile network 103 as illustrated in FIG. 1. Communications connection(s) 833 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 800 also can have input device(s) 832 such as keyboard, keypad, mouse, pen, voice input device, touch input device, etc. Output device(s) 831 such as a display, speakers, printer, etc. also can be included.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for locating a mobile phone using one or more moveable wireless beacons and a direction server; the method comprising:
    (a) sending from said direction server a beacon detection request to said mobile phone;
    (b) receiving by said direction server a beacon status report from at least one of said one or more moveable wireless beacons, said beacon status report comprising an identifier and a location;
    (c) receiving by said direction server a beacon detection report from said mobile phone, said beacon detection report comprising zero or more wireless beacon identifiers;
    (d) determining by said direction server a search pattern; and
    (e) determining and then sending by said direction server at least one movement direction to at least one of said one or more moveable wireless beacons according to said search pattern.

2. The method of claim 1, wherein said beacon detection request further comprises an indicator for said mobile phone to automatically send a beacon detection report whenever said mobile phone identifies a change in detected wireless beacons.

3. The method of claim 1, wherein said beacon detection request further comprises a time interval for said mobile phone to periodically send a beacon detection report.

4. The method of claim 1, wherein said wireless beacon identifier is at least one identifier selected from the group consisting of MAC Address, SSID and UUID.

5. The method of claim 1, wherein said beacon detection report further comprises a location of said mobile phone as determined by said mobile phone.

6. The method of claim 1, wherein said beacon detection report further comprises a received signal strength of at least one detected moveable wireless beacon.

7. The method of claim 1, wherein said beacon status report further comprises a transmit power.

8. The method of claim 1, wherein said determining at least one movement direction uses a track log history of said beacon status reports to maximize the area covered by the movement of said at least one moveable wireless beacon.

9. The method of claim 1, wherein said movement direction is in a form selected from the group consisting of:
    (a) a direction to follow a path described by at least one straight line vector;
    (b) a direction to follow a path described by at least one curve;
    (c) a direction to go to at least one X,Y coordinate;
    (d) a direction to follow a path described by at least one textual description;

(e) a direction to go to a specified moveable wireless beacon; and
(f) a direction to go to the estimated location of the target phone.

10. A system for locating a mobile phone using one or more moveable wireless beacons and a direction server; the system comprising:
   (a) memory comprising instructions; and
   (b) a processor in communication with the memory, wherein the processor, when executing the instructions, performs operations comprising:
      i) sending from said direction server a beacon detection request to said mobile phone;
      (ii) receiving by said direction server a beacon status report from at least one of said one or more moveable wireless beacons, said beacon status report comprising an identifier and a location;
      (iii) receiving by said direction server a beacon detection report from said mobile phone, said beacon detection report comprising zero or more wireless beacon identifiers;
      (iv) determining by said direction server a search pattern; and
      (v) determining and then sending by said direction server at least one movement direction to at least one of said one or more moveable wireless beacons according to said search pattern.

11. The system of claim 10, wherein said beacon detection request further comprises an indicator for said mobile phone to automatically send a beacon detection report whenever said mobile phone identifies a change in detected wireless beacons.

12. The system of claim 10, wherein said beacon detection request further comprises a time interval for said mobile phone to periodically send a beacon detection report.

13. The system of claim 10, wherein said wireless beacon identifier is at least one identifier selected from the group consisting of MAC Address, SSID and UUID.

14. The system of claim 10, wherein said beacon detection report further comprises a location of said mobile phone as determined by said mobile phone.

15. The system of claim 10, wherein said beacon detection report further comprises a received signal strength of at least one detected moveable wireless beacon.

16. The system of claim 10, wherein said beacon status report further comprises a transmit power.

17. The system of claim 10, wherein said determining at least one movement direction uses a track log history of said beacon status reports to maximize the area covered by the movement of said at least one moveable wireless beacon.

18. The system of claim 10, wherein said movement direction is in a form selected from the group consisting of:
   (a) a direction to follow a path described by at least one straight line vector;
   (b) a direction to follow a path described by at least one curve;
   (c) a direction to go to at least one X,Y coordinate;
   (d) a direction to follow a path described by at least one textual description;
   (e) a direction to go to a specified moveable wireless beacon; and
   (f) a direction to go to the estimated location of the target phone.

* * * * *